United States Patent [19]

Peng et al.

[11] Patent Number: 4,946,507

[45] Date of Patent: Aug. 7, 1990

[54] PIGMENT DISPERSANT RESIN: REACTION PRODUCT OF IMIDAZOLINE ARMINE AND ALKYLENE CARBONATE

[75] Inventors: Stephen C. Peng, Utica; Taddesse Gebregiorgis, Sterling Heights, both of Mich.

[73] Assignee: E. I. Du Pont de Nemours and Company, Wilmington, Del.

[21] Appl. No.: 380,544

[22] Filed: Jul. 12, 1989

[51] Int. Cl.$^5$ .................................................. C09D 1/00
[52] U.S. Cl. .................................... 523/400; 106/311; 252/364
[58] Field of Search ............................ 106/287.2, 311; 252/364; 523/400

[56] References Cited

U.S. PATENT DOCUMENTS

| | | | |
|---|---|---|---|
| 2,743,256 | 4/1956 | Groote | 260/45.1 |
| 2,771,434 | 11/1956 | Groote | 252/338 |
| 2,878,233 | 3/1959 | Harrison | 260/47 |
| 2,878,234 | 3/1959 | Peterson | 260/47 |
| 2,966,478 | 12/1960 | harrison | 260/47 |
| 2,994,685 | 8/1961 | Glendale et al. | 260/47 |
| 3,002,941 | 10/1961 | Peterson | 260/18 |
| 3,168,491 | 2/1965 | Isaacs et al. | 260/316 |
| 3,234,155 | 2/1966 | Dearborn et al. | 260/18 |
| 3,335,105 | 8/1967 | Burnthall et al. | 260/29.2 |
| 3,347,808 | 10/1967 | Longmeadow et al. | 106/287.2 |
| 3,474,056 | 10/1969 | Schneider et al. | 260/18 |
| 3,778,280 | 12/1973 | Herten | 106/287.2 |
| 3,870,651 | 3/1975 | Pipkins | 106/311 |
| 3,927,994 | 12/1975 | Romans | 44/63 |
| 3,927,995 | 12/1975 | Romans | 44/63 |
| 4,122,069 | 10/1978 | Meyer | 528/93 |
| 4,155,824 | 5/1979 | Tsou | 204/181 |
| 4,246,394 | 1/1981 | Schülde et al. | 528/117 |
| 4,247,300 | 1/1981 | Bonazza et al. | 44/63 |
| 4,386,967 | 6/1983 | Ramaglia | 106/311 |
| 4,388,214 | 6/1983 | Oppenlaender et al. | 252/392 |
| 4,479,855 | 10/1984 | Thoma et al. | 204/16 |
| 4,484,994 | 11/1984 | Jacobs, III et al. | 204/181 |
| 4,542,173 | 9/1985 | Schupp et al. | 523/414 |
| 4,543,376 | 9/1985 | Schupp et al. | 523/414 |
| 4,710,561 | 12/1987 | Tominaga | 528/111 |
| 4,801,331 | 1/1989 | Murase | 106/311 |

*Primary Examiner*—Paul Lieberman
*Assistant Examiner*—Willie J. Thompson
*Attorney, Agent, or Firm*—John M. Lynn

[57] ABSTRACT

A pigment dispersant useful in cathodic electrocoat compositions is disclosed. This pigment dispersant is the reaction product of alkylene carbonate and a primary amine containing an imidazoline moiety. This pigment dispersant allows the maximazation of pigment to binder ratios and the minimization of volatile organic content (VOC) in electrocoat baths.

6 Claims, No Drawings

PIGMENT DISPERSANT RESIN: REACTION PRODUCT OF IMIDAZOLINE ARMINE AND ALKYLENE CARBONATE

TECHNICAL FIELD

The field of art to which this invention pertains is electrodepositable cationic baths containing a pigment dispersant which is the reaction product of alkylene carbonate with a primary amine containing an imadazoline moiety.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then neutralized with an acid to form a water emulsion which is usually referred to as a principal emulsion.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking.

The prior art of cathodic electrodepositable resin compositions, coating baths, and cathodic electrodeposition processes are disclosed in U.S. Pat. Nos. 3,922,253; 4,419,467; 4,137,140; and 4,468,307.

The pigment dispersant is a very important part of an electrocoat primer composition. The dispersion process involves the separation of the primary pigment particles from their agglomerates or aggregates, the displacement of occluded air and absorbed water, and the wetting and coating of the pigment surfaces with the dispersion resin. Ideally, each primary particle, having been mechanically separated during dispersion, is also stabilized against flocculation. If the pigment particles are not properly dispersed and stabilized in the paint, the advantages built into the pigment by the manufacturer may be lost. For instance, the pigment may settle in the electrodeposition bath which can result in loss of corrosion protection of the substrate. In addition, surface appearance, operating characteristics and so forth may be adversely impacted by inadequate pigment dispersion.

The better the pigment dispersant, the less dispersant is required and thus the pigment to binder to binder ratio can be increased. This can result in a savings on dispersant costs, improved processability, increased production capacity, and lower volatile organic concentration (VOC) in the electrodeposition bath. Current commercial pigment dispersants used in cathodic electrocoat processes typically are polyepoxide resins containing either onium salts or amine salts. Using the pigment dispersants known in the prior art, the maximum pigment to binder ratio that can be obtained is 3:1. These pigment dispersants also require the use of solvents which raise the VOC of the electrocoat bath. Current commercial pigment dispersants contain at least 30 to 40% solvent.

What is needed is a pigment dispersant which will allow a maximazation of the pigment to binder ratio, and a minimization or elimination of the amount of solvent required. This could result in a cost savings for dispersants, improved processability, and a lower VOC in the electrocoat bath.

SUMMARY OF THE INVENTION

It has been discovered that by using a novel pigment dispersant that pigment to binder ratios in the pigment paste can be increased to 12:1 or more. This a very surprising four fold improvement over the current commercial pigment dispersants which require a pigment to binder ratio of about 3:1. In addition, our novel pigment dispersant allows us to eliminate the use of solvent in the pigment dispersant.

The pigment dispersant of our invention is the reaction product of alkylene carbonate with a primary amine containing an imidazoline moiety. The resulting amine imidazoline alkylene carbonate adduct also has the following additional properties: (1) it can be made water dispersible upon protonating with an organic acid; (2) its amination reaction is fast, resulting in little or no side reactions; (3) it has a low viscosity; (4) it has excellent mechanical stability; and (5) it can be made completely soluble in water.

DETAILED DESCRIPTION OF THE INVENTION

Our invention relates to a novel pigment dispersant. This pigment dispersant is potentially usable in a variety of different coatings applications such as spray, dip, roller coating and so forth. Nevertheless, our experimentation thus far has focused upon the use of our novel pigment dispersant in cathodic electrocoat systems. Therefore, the remainder of our specification is directed toward cathodic electrocoat applications of the pigment dispersant. This, however, should not be interpreted as limiting the scope of potential applications for our pigment dispersant.

As previously mentioned, it is well known that most principal emulsions in cathodic electrodeposition baths has a binder resin which is an epoxy amine adduct blended with a cross-linking agent and neutralized with an acid in order to get a water soluble product. Our novel pigment dispersant is potentially usable with a variety of different cathodic electrocoat binder resins, but our preferred binder resin is the typical epoxy amine adduct of the prior art. These resins are disclosed in U.S. Pat. No. 4,419,467 which is incorporated herein by reference.

Likewise our preferred crosslinkers for the above-mentioned binder resins are also well known in the prior art. They are aliphatic and aromatic isocyanates such as hexamethylene diisocyanate, toluene diisocyanate, methylene diphenyl diisocyanate and so forth. These isocyanates are pre-reacted with a blocking agent such as oximes and alcohols which block the isocyanate functionality (i.e. the crosslinking functionality). Upon heating, the oximes or alcohols deblock generating free isocyanate which in turn reacts with the hydroxyl functionality of the backbone resin to give crosslinking. These crosslinking agents are also disclosed in U.S. Pat. No. 4,419,467.

The neutralization of the epoxy-amine resin with an acid to attain its cationic character is also well known in the prior art. The resulting binder (or back-bone) resin is combined with pigment paste, deionized water and additives (anticratering agents, plasticizers and so forth) to form the electrocoat paint bath.

The cationic resin and the blocked isocyanate are the principal resinous ingredients in the principal emulsion and are usually present in amounts of about 30 to 50 percent by weight of solids.

Besides the resinous ingredients described above, the electrocoating compositions of our invention contain a pigment which is incorporated into the composition in the form of a paste. The pigment paste is prepared by grinding pigments into our novel pigment dispersant resin along with optional additives such as wetting agents, surfactants, and defoamers. Pigment dispersants are well known in the art. After grinding, the particle size of the pigment should be as small as practical, generally, a Hegman grinding gauge of about 6 to 8 is usually employed.

Pigments which can be employed in the practice of our invention include titanium dioxide, basic lead silicate, strontium chromate, carbon black, iron oxide, clay and so forth. These are the pigments typically used in automotive primers. Our novel pigment dispersant is also potentially usable with organic pigments in other non-primer applications.

Our novel pigment dispersant is the reaction product of alkylene carbonate with a primary amine containing an imidazoline moiety. Our most preferred alkylene carbonate is propylene carbonate. Another preferred carbonate is ethylene carbonate. Other potential alkylene carbonates include a cyclic carbonic acid ester of the formula:

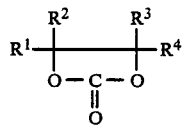

where $R^1$, $R^2$, $R^3$, and $R^4$ each are hydrogen, methyl or ethyl.

The primary amine with the imidazoline moiety (hereinafter imidazoline amine) is a primary amine having the following structure:

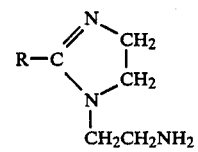

where R is $C_8$–$C_{24}$ alkyl. This compound can be made by reacting carboxylic acids of the formula:

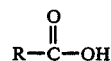

where R is defined as above with diethylenetriamine. The carboxylic acid is added slowly to the diethylenetriamine in the presence of a solvent to generate heat of nuetralization. After heat of neutralization, the mixture is then heated under reflux to 150°–160° C. until the water of condensation is completely removed. The solvent is then removed under reduced pressure to give the final product (i.e. the imidazoline amine).

If this imidazoline amine is then reacted with propylene carbonate, our preferred alkylene carbonate, it forms a resin with the formula:

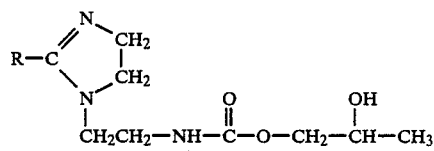

where R is defined as above.

It is important to react the imidazoline amine compound and the propylene carbonate stoichemitrically. If there is excess imidazoline amine the dispersant contains unreacted imidazoline amine which makes the final coating water sensitive and results in physical defects such as pinholing. If there is excess propylene carbonate then there will likely be physical defects in the final electrocoating.

The reaction between the imidazoline amine compound and the propylene carbonate takes place by adding propylene carbonate slowly to the imidazoline amine at 104° F. and allowing the reaction to exotherm to about 160° F. The reaction is held at this temperature until a theoritical amine equivalent of the reaction product of about 369 is achieved (experimental amine equivalent weight of 373).

Reacting the imidazoline amine compound and alkylene carbonate under the reaction conditions described above gives a reaction product with minimal side reactions. This product has the following characteristics: (1) it can be made water dispersible upon protonating with an organic acid; (2) its amination reaction is fast, resulting in little or no side reactions; (3) it has a low viscosity; (4) it has excellent mechanical stability; and (5) it can be made completely soluble in water. Our preferred neutralization acid is lactic acid.

The pigment-to-resin weight ratio in the electrocoat paint bath is very important and should be preferably less than 50:100, more preferably less than 40:100, and usually about 20 to 40:100. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol 104 ®. These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0 to 15 percent by weight resin solids.

Curing catalysts such as tin catalysts are usually present in the composition. Examples are dibutyltin dilaurate and dibutyltin oxide. When used, they are typically present in amounts of about 0.05 to 2 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferrably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLE

The following example discloses the preparation of our novel pigment dispersant resin, a pigment paste made from the dispersant resin and a cathodic electrocoat bath made from the pigment paste and a typical binder resin.

The resinous binder that was used in the following example is a basic amine epoxy adduct blended with a blocked isocyanate crosslinker and neutralized with an acid. These kinds of cathodic electodepositable binder resins are well known in the prior art. The particular resin used in our examples is disclosed in U.S. Pat. No. 4,419,467 which is incorporated herein by reference. This nuetralized epoxy amine resin will be referred to hereinafter as the '467 binder resin.

In the following example, the imidazoline amine compound which is the precursor to the pigment dispersant has the following formula:

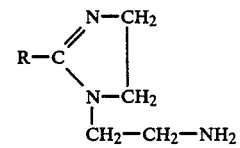

where R is $C_{12}$–$C_{16}$. This compound is hereinafter referred to as the "imidazoline amine compound" and is made as described supra page 7.

Preparation of Imidazoline Amine/Propylene Carbonate Adduct

This adduct was prepared from the following ingredients.

| Ingredients | Grams | Solids |
| --- | --- | --- |
| Imidazoline Amine | 2000 | 2000 |
| Proplyne carbonate | 764 | 764 |

The imidazoline amine compound was charged to a reaction kettle and heated to 104° F. At 104° F., the heating mantle was dropped and proplyne carbonate was added slowly. The reaction was allowed to exotherm to 160° F. The reaction mixture was then held at 160° F. until a theoritical amine equivalent weight of 369 was obtained (experimental amine equivalent weight of 373). The reaction product had a solids content of 100%.

Preparation of neutralized resin from imidazoline amine/propylene carbonate adduct 909 grams of the imidazoline amine/propylene carbonate adduct and 174.5 gms of 88% lactic acid were charged to a reaction kettle and heated to 100° F. The batch was allowed to exotherm to 125° F. When the temperature reached 125° F., 2264 grams of deionized water were added slowly to disperse the resin. The reaction mixture was held at 125° F. for 60 minutes (to hydrolyze the imidazoline ring). The neutralized resin had a 32% resin solids content and a pH of 8.08.

Preparation of the pigment paste from the neutralized resin

A pigment paste using the neutralized pigment dispersant resin described above was prepared from the following ingredients:

| Ingredients | Grams | Solids |
| --- | --- | --- |
| Neutralized dispersant resin (as described above) | 120.20 | 38.46 |
| Surfynol 104 ® (defoamer available from Air Products) | 1.92 | |
| Clay | 57.97 | 57.97 |
| pb silicate | 24.88 | 24.88 |
| Carbon black | 29.08 | 29.08 |
| TiO$_2$ | 331.39 | 331.39 |
| Dibutyltin oxide | 18.28 | 18.28 |
| Deionized water | 266.28 | |

The above ingredients were ground in zirconium media to a Hegman No. 7 to 7¼. The paste had a 61.5% solids content and a pH of 7.92. The pigment to binder ratio was 12:1.

Preparation of a coating composition from the pigment paste

A cationic electrodepositable paint was prepared by using the '467 binder resin and the pigment paste described above.

| Ingredients | Grams | Solids |
|---|---|---|
| '467 binder resin | 923.38 | 327.8 |
| Pigment paste (described above) | 117.45 | 72.23 |
| Deionized water | 959.32 | |

To the emulsion (923.38 gms), 959.32 gms deionized water was added followed by 117.5 gms pigment dispersion. This electrodeposition bath showed a pH of 6.00, had a solids content of 20% and pigment to binder ratio of 0.2/1.0. Phosphated panels were electrodeposited in this paint at 340 volts for 135 seconds at a bath temperature of 87° F. The wet films were baked at 360° F. for 30 minutes to produce dry, smooth films having a film thickness of 0.80 mil. The cured film withstood 200 methyl ethyl ketone double rubs.

We claim:

1. A pigment dispersant which is prepared by bringing into contact compound (i) an alkylene carbonate with a compound (ii) of the structure:

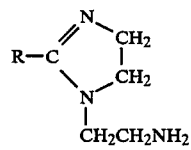

where R is $C_8$–$C_{24}$ alkyl.

2. The pigment dispersant of claim 1 wherein the alkylene carbonate and compound (ii) are reacted stoichemitrically so that there is not an excess of the alkylene carbonate or compound (ii).

3. The pigment dispersant of claim 1 wherein said pigment dispersant is used in cathodic electrocoat compositions and the pigment to binder ratio can be 12:1 or more.

4. The pigment dispersant of claim 1 wherein said pigment dispersant contains no solvents and thus is 100% solids.

5. The pigment dispersant resin of claim 1 where the alkylene carbonate is propylene carbonate and the resulting pigment dispersant has the formula:

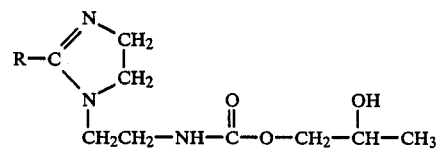

where R is $C_8$–$C_{24}$ alkyl

6. A cathodic electrodepositable paint comprising an epoxy-amine resin, a pigment, and a pigment dispersant which is the reaction product of an alkylene carbonate with a compound of the structure:

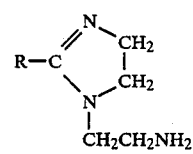

where R is $C_8$–$C_{24}$ alkyl.

* * * * *